(12) United States Patent
Engelhardt et al.

(10) Patent No.: US 9,812,129 B2
(45) Date of Patent: Nov. 7, 2017

(54) MOTOR VEHICLE DEVICE OPERATION WITH OPERATING CORRECTION

(71) Applicant: AUDI AG, Ingolstadt (DE)

(72) Inventors: Doreen Engelhardt, Ingolstadt (DE); Jana Paulick, Ingolstadt (DE); Kerstin Tellermann, Munich (DE); Sarah Schadl, Tutzing (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/327,057

(22) PCT Filed: Jul. 17, 2015

(86) PCT No.: PCT/EP2015/066404
§ 371 (c)(1),
(2) Date: Jan. 18, 2017

(87) PCT Pub. No.: WO2016/082942
PCT Pub. Date: Jun. 2, 2016

(65) Prior Publication Data
US 2017/0169821 A1      Jun. 15, 2017

(30) Foreign Application Priority Data

Nov. 24, 2014  (DE) .................... 10 2014 017 385

(51) Int. Cl.
*G10L 15/22* (2006.01)
*B60R 16/037* (2006.01)
*G01C 21/36* (2006.01)

(52) U.S. Cl.
CPC .......... *G10L 15/22* (2013.01); *B60R 16/0373* (2013.01); *G01C 21/3608* (2013.01); *G10L 2015/221* (2013.01)

(58) Field of Classification Search
CPC ....................................................... G10L 15/22
See application file for complete search history.

(56) References Cited

U.S. PATENT DOCUMENTS

| | | | | | |
|---|---|---|---|---|---|
| 5,712,957 A | * | 1/1998 | Waibel | ...................... | G06K 9/03 704/240 |
| 5,855,000 A | * | 12/1998 | Waibel | ...................... | G06K 9/03 382/186 |

(Continued)

FOREIGN PATENT DOCUMENTS

| CN | 102915733 A | 2/2013 |
|---|---|---|
| CN | 103645876 A | 3/2014 |

(Continued)

OTHER PUBLICATIONS

German Office Action dated Jul. 1, 2015 of corresponding application No. DE10 2014 017 385.2; 7 pgs.

(Continued)

*Primary Examiner* — Jialong He
(74) *Attorney, Agent, or Firm* — Maier & Maier, PLLC

(57) ABSTRACT

A method for operating a motor vehicle operating device to carry out with voice control two operating steps. A first vocabulary is set, which is provided for the first operating step, to a speech recognition device. Based on the first set vocabulary, a first recognition result is generated and the first operating step is carried out. A second vocabulary, which is provided for the second operating step, is then set to the speech recognition device and a second speech input is received. A repetition recognition device recognizes during or after the second speech input a correction request of the user. The first operating step is then reversed for the device and the first vocabulary is reinstalled again for the speech recognition device. The first operating step is repeated based on a second recognition result that is detected in dependence on a part of the second speech input.

7 Claims, 1 Drawing Sheet

(56) References Cited

U.S. PATENT DOCUMENTS

| | | | |
|---|---|---|---|
| 5,987,414 A * | 11/1999 | Sabourin | G10L 15/26 704/245 |
| 6,067,521 A | 5/2000 | Ishii et al. | |
| 6,128,594 A | 10/2000 | Gulli et al. | |
| 6,230,132 B1 | 5/2001 | Class et al. | |
| 2002/0013706 A1* | 1/2002 | Profio | G10L 15/08 704/254 |
| 2003/0125869 A1* | 7/2003 | Adams, Jr. | G01C 21/20 701/532 |
| 2004/0024601 A1 | 2/2004 | Gopinath et al. | |
| 2005/0055210 A1* | 3/2005 | Venkataraman | G10L 15/183 704/255 |
| 2006/0287868 A1 | 12/2006 | Ikeda et al. | |
| 2007/0005361 A1* | 1/2007 | Huning | G10L 15/32 704/251 |
| 2008/0189106 A1* | 8/2008 | Low | G01C 21/3608 704/231 |
| 2009/0030696 A1* | 1/2009 | Cerra | G10L 15/30 704/275 |
| 2016/0379629 A1* | 12/2016 | Hofer | G06F 17/277 704/257 |

FOREIGN PATENT DOCUMENTS

| | | |
|---|---|---|
| JP | 2000163091 A | 6/2000 |
| KR | 20040035151 A | 4/2004 |
| WO | 2009109169 A | 9/2009 |
| WO | 2014/144949 A2 | 9/2014 |

OTHER PUBLICATIONS

German Office Action dated Mar. 9, 2016 of corresponding application No. DE10 2014 017 385.2; 7 pgs.

International Search Report and Opinion dated Nov. 4, 2015 of corresponding application No. PCT/EP2015/066404; 11 pgs.

Translation of the International Preliminary Report on Patentability dated Jun. 8, 2017, in connection with corresponding international Application No. PCT/EP2015/066404 (6 pgs.).

Chinese Office Action dated Sep. 8, 2017, in connection with corresponding CN Application No. 201580038865.X (5 pgs.).

* cited by examiner

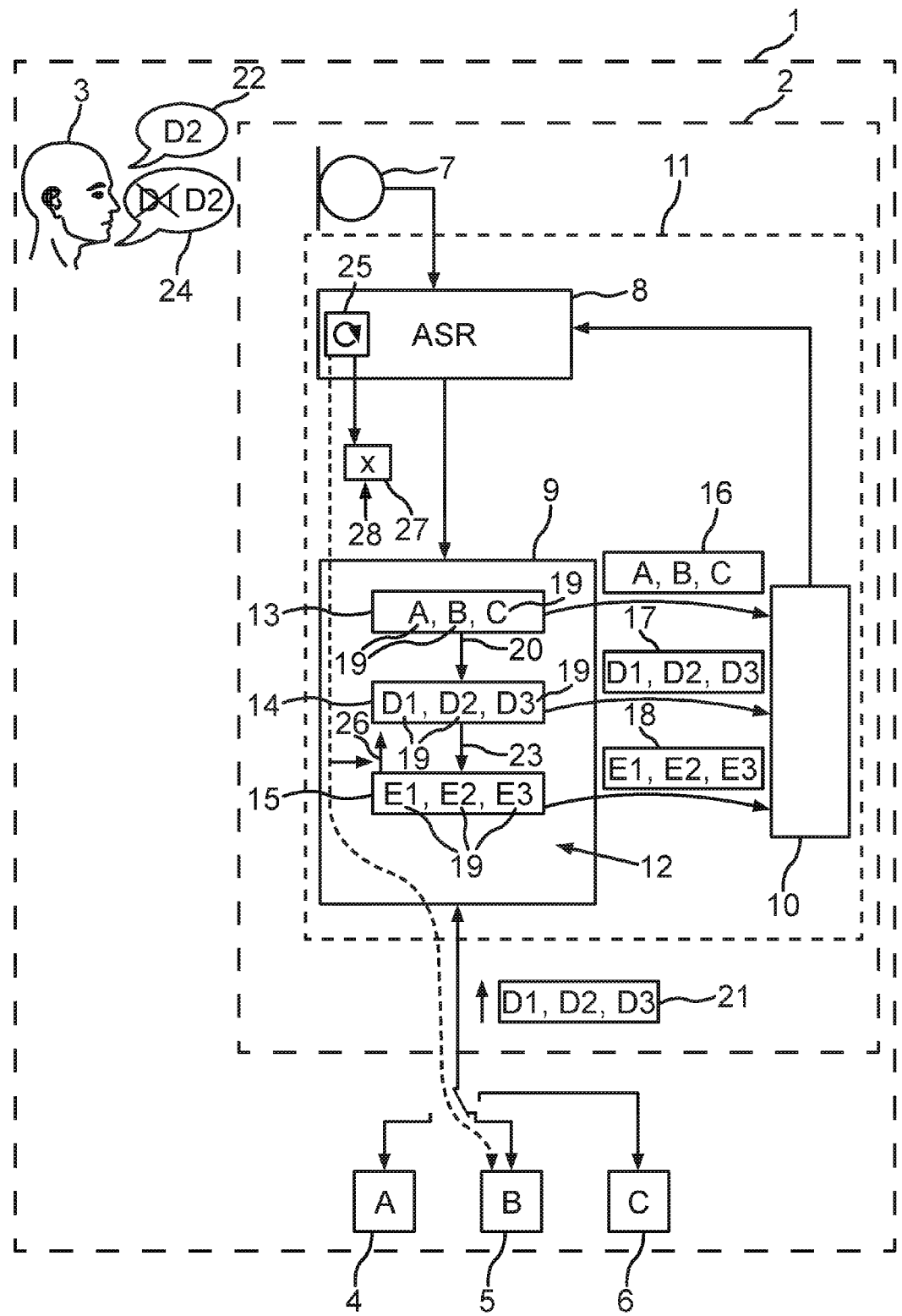

MOTOR VEHICLE DEVICE OPERATION WITH OPERATING CORRECTION

BACKGROUND

The invention relates to a method for operating a motor vehicle device so as to carry out at least two successive operating steps that are based one on another in response to voice control on a device of the motor vehicle. For example, when a navigation target is input on a navigation device, the name of the town should be input first, which can be followed by the name of the street. The invention also includes an operating device for carrying out the method, as well as a motor vehicle with the operating device according to the invention.

Data that is entered verbally, for example a name of a town that was pronounced but that was not recognized correctly by the speech recognition system, must be currently input again with a two-step correction process. The reason for this is that a speech recognizing device is as a rule provided with a dynamic vocabulary, which is to say its own vocabulary is provided for every operating step, and it contains only speech commands that are possible with this operating step. In this manner, the speech recognition is more robust.

A dynamic vocabulary often has a very large amount of data. However, the recognition is more accurate the less data needs to be recognized. For this reason, the recognition is reduced in continuous dialog steps to the data expected from the following dialog step.

The two-step dialog process described here therefore generally provides that speech recognition is conveyed via a voice command, such as "change" or "correction", when the previous speech must be corrected. After that, a system output is reported back to the user, for example as "correction" to indicate that the initiated correction phase was understood. This is followed by a system output prompting the user to input the data again, for example in the form of speech output "please, indicate the name of the town". Without the command "correction" or "change", on the other hand, the operation is carried out during the next step, wherein the speech recognition devices assumes that the recognition was correct. In this continuing operating step, however, the recognition is reduced to the voice commands for the second operating step, such as for example the name of the street. If the user simply just pronounces one more time the name of the town, it will not be recognized in any case.

If the user wants to correct his input data at this point, without having to say a command such as "correction" and wait, this voice command will be always detected as false because there is no more room available for recognizing the previous speech input in the new dialog state.

The two-step correction process is time-consuming for the user and it steers the user away from the driving process in an undesirable manner in particular during driving. Essentially, however, it is not intuitive because the human-to-human communication commands, such as "correction", are not used.

It is known from U.S. Pat. No. 6,128,594 A that that a verification of detected voice commands can be also generated. The user can then initiate a correction of recognized speech results by means of a voice command. Individual words can be corrected in this manner in the recognized speech results before the command is executed on a device.

From KR 2004 0035151 A is known a method for speech detection with an output of recognized speech commands. The user can cause a new input by operating a switch. When the speech command is then correctly recognized, the operation of the device can continue.

SUMMARY OF THE DISCLOSURE

The object of the invention is to avoid the two-step correction process by using a dynamic vocabulary with a an operating device for a device with the recognition of an error.

The objective is achieved with the subject of the independent patent claims. Advantageous further developments of the invention are achieved with the features of the dependant claims.

The invention provides a method for operating a motor vehicle operating device to carry out two successive operating steps building upon each other in dependence on speech control in a device of the motor vehicle, which is to say when, for example, the input of a name of a town is then followed by the street name. A first vocabulary is adjusted for a speech recognition device, which is provided for the first operating step. In the example described here, the first vocabulary comprises for example the names of towns. Another designation for the vocabulary can be also the grammar of the speech recognizer.

For a first speech input of a user, a first recognition result is generated on the basis of the adjusted vocabulary and the first operating step is carried out depending on the first recognition result. For example with a navigation system, the recognized town name is input and signaled to the navigation system so as to now carry out the next query, which is to say the one relating to the street name. Instead of the first vocabulary, a vocabulary that is at least partially different is set in the speech recognition device, which is provided for the second operating step. In the example, these would be the street names. Furthermore, a second speech input of the user is detected.

It is now necessary to detect with the operating device whether the user really wanted to input a street name, or whether he want to correct the previously detected city name. According to the invention, a repetition recognition device recognizes for this purpose with or after the detection of the second speech the input of a correction request of the user. If the correction request is detected, than according to another step of the method of the device, the first operating step is undone. The state of the device is therefore set to a previous state. Furthermore, the first vocabulary is set again for the speech recognition device instead of the second vocabulary. After that, at least one part of the second speech input is generated on the basis of a second recognition results of the reinstalled first vocabulary. The first operating step is the carried out one more time in dependence on the second recognition result.

The advantage of the invention is that the correction is now a one-step process for the first operating step, therefore resulting in a faster correction, which goes along with the second speech input. Thanks to the repetition recognition device, it is not necessary for the user to initiate a correction ahead of time, after that to wait until the speech recognition device is ready again, and only then to repeat one more time the first speech input, which is to say for example the name of the town.

If a correction request is not detected by the repetition recognition device, which is to say when a request to continue is detected by the repetition recognition device instead of a correction request, the second vocabulary can be maintained, which is to say set. A second recognition result can be generated on the basis of the set second vocabulary and the second operating step can be performed in dependence on the second recognition input. For example, the street name will be determined in the navigation device.

The method according to the invention is used particularly advantageously when it is associated with a speech recognition system that has a dynamic vocabulary, wherein each vocabulary defines voice commands that can be used by the user, and in particular when the second vocabulary has speech commands used for control that are missing in the first operating step. In other words, the amount of the data in the second vocabulary can remain small because it does not need to include the first vocabulary.

The invention is provided with several further developments for detection of the correction request.

In a further development, the repetition recognition device detects the correction request in dependence on a spoken utterance that has been created by the user at the beginning of the second speech input. In other words, an introductory correction command is detected.

In particular, words used by a user are evaluated or recognized intuitively as a correction command. Examples of such expressions are: "No, . . . ", "Oh . . . ", "No, I meant . . . ", or "I meant" . . . ". When the introductory verbal utterance is recognized, the advantage is that the user does not need to turn the attention away from the driving process since he only needs to carry out a single second speech input.

In another further development of the invention, the repetition recognition device recognizes the correction request in dependence on the duration of a first speech pause, which extends from the carrying out of the first operating step until the beginning of the second speech input. In other words, a hesitation of the user is interpreted as a correction request.

In another further development, the correction request is recognized by the repetition recognition device in dependence on an actuation signal of an actuation element, which the user has activated during the second speech input. For example, a button can be provided that the user presses while he pronounces the second speech input. This is a particularly robust embodiment for recognition of the correction request. Also, in this case, it is not necessary for the user to avert his view.

As was already mentioned, the undoing of the first operating step and the reinstalling of the first vocabulary is carried out without any participating action by the user and in one step by the operating device. In other words, the correction and a new input are carried out together with the first operating step.

In a particularly preferred embodiment, voice control is exercised in both operating steps with a speech dialog system. In order to set again the first vocabulary, a prior dialog or dialog step state is set for the speech dialog system. In other words, a dialog step is carried out backwards. This has the advantage that the vocabulary belonging to the dialog step is automatically activated. Therefore, it is not necessary to rearrange the actual speech recognition device in order to reorganize the vocabulary.

The method according to the invention has proven particularly advantageous with the following devices: a digital address book, a navigation device, a telephony system. Corresponding further developments of the invention are provided that relate to the first operation step and to the second operating step: relating to a database search in an address book, or to a step-wise route planning for navigation assistance, or to establishing a telephone connection with a telephony system.

As particularly advantageous has been found the case when after the setting of the second vocabulary, a command display is provided, which informs the user how the correction request is signaled. The advantage obtained in this case is that the operation of the operating device is self-explanatory.

The invention also includes an operating device for a motor vehicle. The operating device is provided with a speech recognition device for recognizing a speech input of a user. Furthermore, a processor device is provided in order to output control commands to a device of the motor vehicle. One operating step is carried out, respectively, with each control command. The processor device is adapted to carry out an embodiment of the method according to the invention.

Finally, the invention also includes a motor vehicle that is equipped with an embodiment according to the invention. The motor vehicle according to the invention is preferably configured as an automobile, in particular as a passenger car.

BRIEF DESCRIPTION OF THE DRAWINGS

An embodiment of the invention will be explained next. In addition, a single FIGURE (Fig.) is provided that shows a schematic representation of an embodiment of the motor vehicle according to the invention.

The practical example described below is a preferred embodiment of the invention. However, the components described in the embodiment represent individual features of the invention that should be considered as being independent of each other, and which are further developed independently of the invention and thus should be regarded as individual component parts of the invention also in other combinations than those shown here.

DETAILED DESCRIPTION OF THE DRAWINGS

Moreover, the embodiment described here can be supplemented also by other features of the description that have been already described.

The FIGURE shows a motor vehicle 1, which can be an automobile, in particular a passenger car. The motor vehicle 1 can be equipped with an operating device 2 by means of which a user 3 can operate with voice commands one or several device 4, 5, 6. For example, the device 4 can be a telephone device provided with an address book, which is here symbolically indicated by the designation "A". The device 5 can be for instance a navigation device for navigation assistance, which is here symbolically indicated with the designation "B". The device 6 can be for instance a media reproduction system, which is in the FIGURE symbolically indicated with the designation "C".

In order to operate devices 4, 5, 6, the user can for example pronounce the names of the devices, or for example "A", "B", "C" and then pronounce step-wise individual voice commands one after another in order to activate a predetermined functionality of the device. In the example it is assumed that the user 3 selects the navigation device so as to enter a navigation destination, wherein he sets successively, one after another, the name of the town, which is set as the target destination in the navigation device as a first operating step, and then the name of the street, which is set as the second operating step of the navigation target in the navigation device.

For voice operations, the operating device 2 can be provided with a speech detection device 7, a speech recognition device 8 (ASR—Automatic Speech Recognition— automatic speech recognition), a speech dialog system 9, and a control device 10. The speech detection 7 can be for example a microphone or multiple microphones. The speech recognition device 8 can be realized for instance as a program module of a processor device 11 of the operating device 2. It is also possible to use a design wherein the speech recognition device 8 carries out the actual speech recognition by means of an external speech recognition system located outside of the vehicle, which can be connected with the speech recognition device 8 for example by a radio connection and which can be linked through internet.

The speech dialog system can be also a program module of the processor device 11.

The speech dialog system 9 can be provided for example with a speech dialog 12 that has multiple dialog steps 13, 14, 15. For each dialog step 13, 14, 15 can be provided a specialized recognition vocabulary, which is simply called vocabulary 16, 17, 18, or which contains possible voice commands 19. The speech recognition device 8 is configured for each dialog step 13, 14, 15 in a per se known manner with a control device 10, which sets respective valid vocabulary 16, 17, 18. This enables a robust and faster speech recognition. The control device 10 can be for this purpose realized as a processor device and/or a program module of the processor device 11.

In the example it is assumed that the user 3 has first made a selection by pronouncing the designation "B" in order to define the navigation target. The voice sound of this speech input was detected by the speech detection device 7 and converted into electrical and/or digital signal, which was transmitted to the speech recognition device 8 that has recognized it on the basis of the vocabulary 16 set by the control device 10 for designation B, and that has forwarded this speech recognition result to the speech dialog system 9. With the speech dialog system 9, a selection can then be made between devices 4, 5, 6 in such a way that the speech dialog system 9 will be coupled with the device 5, which is to say with the navigation system.

The speech dialog system 9 has thereupon been changed from the dialog step 13 in a forward step 20 of the dialog step 13 to the dialog step 14. The vocabulary 17 for the dialog step 14 may be received by the speech dialog system 9 for example as operation vocabulary 21. These can be for example names of towns D1, D2, D3.

The vocabulary 17 may be provided by the speech dialog system 9 of the control device 10, which then sets vocabulary 16 or replaces it with the vocabulary 17 in the speech recognition device 8.

In order to carry out the first operating step on the device 5, which is to say for example the setting of the name of a town to the device 5, the user can say the name of the desired town in a first speech input 22; which can be here for example D2. The speech detection device 7 will detect the speech input 22 in the manner described above and the detected speech input is recognized with the speech recognition device 8 on the basis of the set vocabulary 17.

If the speech recognition device 8 recognizes the first speech input 22, namely in this case one of the names of the towns D1, D3 or D3, this will then be executed as a voice command, which means that the speech dialog system 9 can set the town name to the device 5 as the first operating step. After that, the device 5 waits for a second operating step. Accordingly, the speech dialog system 9 will be changed in a forward step 23 from the dialog step 14 to the dialog step 15. In the dialog step 15 can be received again for example from the device 5 in the manner described above an operating vocabulary to control or execute the second operating step, which is here the setting of the name of the street. The vocabulary 18 for the second operating step can then be supplied again in the manner described above from the speech dialog system 9 to the control device 10, which will set the vocabulary 18 instead of the vocabulary 17 for the speech recognition device 8. The user can now pronounce the street names E1, E2, E3 and according to that, the corresponding street name will be set in a second operating step for the device 5.

In the example illustrated in the FIGURE it is assumed that the speech input 22 is understood incorrectly in the dialog step 22. For example, the speech recognition device 8 does not understand the voice command for the town name D2, but instead has understood incorrectly the name as the town name D1. A vocabulary for town names is now loaded in the forward step 23 and installed in the speech recognition device 18 by the control device 18. In the example it is assumed that the user now realizes that the incorrect town was selected. This would mean that the user would carry out a false first operating step. To make a correction, the user therefore speaks one more time, pronounces the voice command for a first operating step but also makes verbally clear that an error is involved. For example, he can express this as: "No, I mean D2". Other examples are: "No, not D1, but D2," or "No, D2", or "Back, D2." This second speech input 24 is then again supplied by the speech detection device 7 to the speech recognition device 8. However, the speech recognition device 8 has at this point already set the vocabulary 18 for the second operating step according to the dialog step 15. No voice commands for town names are contained in it, which is to say they are missing.

Therefore, since the correction request of the user D3 is still recognized, the speech recognition device, or generally the operating device 2, can be provided with a repetition recognition device 25. The repetition recognition device 25 detects or recognizes the correction request of the user 3 and thus deletes a backward step 26 in the speech dialog system 9 and brings it from the dialog step 15 to the dialog step 14. Therefore, the vocabulary for the recognition of the voice command is changed again back from the vocabulary 18 to the vocabulary 71.

The repetition recognition device 25 also ensures or is designed to perform a correction in the device 5. The first operating step, which is here the setting of the town name, is carried out with the device 5 in backward order. For example, the device state 5 can be reset. In order to undo it, the interpretation of respective devices 4, 5, 6 must be taken into consideration. It is possible to provide for example a suitable backward resetting step 26 for each forward step 20, 23 in the dialog system 9 and a corresponding control signal can be provided for each backward resetting step for the device 4, 5, 6, which will undo the forward step 20, 23. This can be for example set up or stored in a table of commands.

The repetition recognition device 25 thus recognizes with the speech input 24 that the user 3 did not want to control the second operating step with the speech input 24, which is to say that the user for example wanted to input the name of the street and to correct or repeat the first operating step. The repetition recognition device can be provided with or use for example an auxiliary vocabulary 27, which can be provided with one or a plurality of speech utterances 28, through which the user 3 can signal with a high probability a correct request. Examples for such a vocabulary can be: "No", or "No, I meant".

If such a speech utterance 28 is recognized at the beginning in a speech input 24, this will be recognized as a signal for a correct request by the repetition recognition device 25, the first operating step will be undone in the manner described above, and the first vocabulary 17 will be set or activated in the speech recognition device 28 for repetition of the first operating step. After that, the remaining part of the speech input 24, which is to say the repeated town name D2 in this example, will be recognized on the basis of the vocabulary 17.

If the correct speech input 24 is recognized, the operation will continue in the manner described above so that the dialog step 15 is activated in the forward step 23, the correct town name D2 is set in the device 5 and the first operating step will thus be successfully carried out.

After that, the device 5 is ready again to receive a street name and the speech recognition device 8 is also set with the vocabulary 18 for recognition of a street name.

After a misunderstood data input, the user can thus correct in one step with introductory commands such as "No, I meant" plus the new data input the previously input and incorrectly understood data. The recognizer thus recognizes in this manner that the data relate to the previous dialog state and opens up the possibility to search for the previous dialog step. A quick correction is thus made possible with one-step process. Moreover, the new data input is designed in a much more intuitive manner for the user.

With the front-loaded command "No, I meant . . . " or "Yes, I meant . . . ", the recognizer signalizes that the space for recognition of the previous step should be opened. The data to be recognized are now reduced to the data from the previous dialog step. After the command "No, I meant", the new speech content can be input.

Overall, the example shows how a prompt correction can be provided according to the invention for a speech input of data with voice operations.

The invention claimed is:

1. A method for operating a motor vehicle operating device based on voice control with first and second operating steps that are based on each other in a device of a motor vehicle, comprising:
   a first vocabulary, provided for the first operating step, is set with a speech recognition device and
   on the basis of the set first vocabulary, a first recognition result is generated for a first speech input of a user,
   the first operating step is carried out based on the first recognition result and
   instead of the first vocabulary, a second vocabulary, which is at least partially different from the first vocabulary, is set for the speech recognition device and
   a second speech input of the user is detected,
   wherein a repetition device recognizes a correction request of a user with or after the detection of the second speech input and reactivates the first vocabulary for the speech recognition device instead of the second vocabulary, and a second recognition result is generated on the basis of the reactivated first vocabulary based on at least one part of the second speech input, and the first operating step is carried out one more time based on the second recognition result.

2. The method according to claim 1, wherein the first vocabulary and the second vocabulary determines a plurality of usable speech commands, and in the second vocabulary, the speech commands for controlling the first operating step are missing.

3. The method according to claim 1, wherein the correction request is recognized with the repetition recognition device and based on:
   a duration of a speech pause, extended from the carrying out of the first operating step until the beginning of the second speech input; or
   an activation signal of an operating element, which the user activates during the second speech input.

4. The method according to claim 1, wherein the the first operating step and the reactivation of the first vocabulary is carried out by the operating device without the participation of the user.

5. The method according to claim 1, wherein the voice control over both operating steps is carried out through a speech dialog system and a previous dialog state is set for the reactivation of the first vocabulary for the speech dialog system.

6. The method according to claim 1, wherein the first operating step and the second operating step relate to:
   a database search in an address book, or
   a step-wise route planning for navigation assistance, or
   the establishing of a telephone connection with a telephony system.

7. The method according to claim 1, wherein after the setting of the second vocabulary, a command display is shown, which indicates to the user how a correction request is to be signaled.

* * * * *